Patented Oct. 18, 1932

1,882,816

UNITED STATES PATENT OFFICE

MAX HAGEDORN, OF DESSAU IN ANHALT, GERMANY, ASSIGNOR TO I. G. FARBENINDUSTRIE AKTIENGESELLSCHAFT, OF FRANKFORT-ON-THE-MAIN, GERMANY

PROCESS OF ENHANCING THE VISCOSITY OF TECHNICAL OILS

No Drawing. Application filed October 30, 1929, Serial No. 403,673, and in Germany November 29, 1928.

My present invention relates to a process for enhancing the viscosity of oils, and to the products obtainable by this process. More particularly it relates to a process to thicken oils used for lubricating purposes, as insulating material, and for other technical purposes.

According to my invention, derivatives of poly-saccharides are dissolved in the oils to be thickened. For this purpose, there may be used all esters, mixed esters, ethers, and ether-esters of the polymeric carbohydrates, especially such of starch and cellulose which are soluble in the oils to be improved. I prefer to add such derivatives of polysaccharides to the oil which are insensitive to the action of water. I found that the said cellulose ethers tend neither to polymerization and resinification nor to decomposition even when highly heated in the oleic solution. As suitable derivatives of polymeric carbohydrates I mention by way of example ethers of the cellulose, as for instance triethylcellulose, cellulose esters containing in their nucleus the residue of naphthenic acid or of lauric acid, starch laurate, benzyl-cellulose, hydroxypropyl-cellulose stearate, hydroxybutyl-starch butyrate, dextrine naphthenate.

Other compounds of the group in question, suitable for my purpose may be found by a simple experiment.

The degree of the viscosity of the oils may be enhanced in any desired manner by dissolving in them varying quantities of derivatives of polysaccharides. Furthermore, I made the surprising observation that the viscosity of the oils containing cellulose derivatives remains constant within considerable ranges of temperature.

The following examples illustrate the invention, the parts being by weight:—

*Example 1.*—7 parts of triethyl cellulose are dissolved in 100 parts of castor oil having at 100° C. a viscosity of 3.0 degrees Engler. The oil has then a viscosity which is so high that it can no longer be determined in the Engler viscosimeter even at 100° C. at temperatures between the limits of −10° C. and +30° C. the viscosity is constant.

*Example 2.*—10 parts of cellulose naphthenate are dissolved in 100 parts of whale oil. Before the addition the whale oil had at 100° C. a viscosity of 1.5 degrees Engler, after the cellulose ester has been dissolved therein, the viscosity of the solution raises to 4.1 degrees Engler at 100° C.

*Example 3.*—9 parts of cellulose naphthenate are dissolved in 100 parts of transformer oil which at 100° C. has a viscosity of 1.0 degree Engler. Thereupon the oil has at 100° C. a viscosity of 2.5 degrees Engler which remains constant at temperatures lying between −10° C. and +30° C.

The expression "technical oils" as used herein and in the following claims means lubricating oils, insulating oils, transformer oils and oils useful for analogous technical purposes for which mineral, animal or vegetable, non-volatile oils are used, these oils retaining their oily behavior during use.

What I claim is:—

1. A non-resinifying technical oil comprising an oil selected from the group consisting of non-volatile vegetable, animal and mineral oils, and dissolved therein a small quantity of a derivative of a polysaccharide.

2. A non-resinifying technical oil comprising an oil selected from the group consisting of non-volatile vegetable, animal and mineral oils, and dissolved therein a small quantity of a derivative of cellulose.

3. A non-resinifying technical oil comprising an oil selected from the group consisting of non-volatile vegetable, animal and mineral oils, and dissolved therein a small quantity of a cellulose ester.

4. A non-resinifying technical oil comprising an oil selected from the group consisting of non-volatile vegetable, animal and mineral oils, and dissolved therein a small quantity of cellulose naphthenate.

5. A composition of matter comprising 100 parts of castor oil and dissolved therein 7 parts of triethyl cellulose, said preparation having a constant viscosity between −10° to +30° C.

6. A composition of matter comprising 100 parts of whale oil and dissolved therein 10 parts of cellulose napththenate, said preparation having at 100° C. a viscosity of 4.1 degrees Engler.

7. A composition of matter comprising 100 parts of mineral transformer oil and dissolved therein 9 parts of cellulose naphthenate, said preparation having at 100° C. a viscosity of 2.5 degrees Engler, and a constant viscosity between −10° to +30° C.

In testimony whereof, I affix my signature.

MAX HAGEDORN.